United States Patent [19]
Hostetler et al.

[11] Patent Number: 4,869,054
[45] Date of Patent: Sep. 26, 1989

[54] SLOPE MOWER WITH SIDE FRAMES

[75] Inventors: Dewey L. Hostetler; David L. Lansdowne; Howard O. Hershberger, all of Harper, Kans.

[73] Assignee: DewEze Corporation, Harper, Kans.

[21] Appl. No.: 124,968

[22] Filed: Nov. 24, 1987

Related U.S. Application Data

[63] Continuation-in-part of Ser. No. 854,102, Apr. 21, 1986, Pat. No. 4,707,971.

[51] Int. Cl.[4] .......................................... A01D 34/66
[52] U.S. Cl. ...................................... 56/6; 56/10.2; 56/16.2; 280/6.12
[58] Field of Search ................... 56/6, 13.6, DIG. 22, 56/16.2, 7, 208–212, 14.7, 11.9, 15.2, 10.9, 10.2; 180/41; 280/755, 6

[56] References Cited

U.S. PATENT DOCUMENTS

| | | | |
|---|---|---|---|
| 2,750,204 | 6/1956 | Ohrmann | 280/755 |
| 2,780,903 | 2/1957 | Kroll et al. | 56/209 |
| 2,801,511 | 8/1957 | Vogelaar | 56/209 |
| 2,872,200 | 2/1959 | Kroll | 280/6.1 |
| 2,909,342 | 10/1959 | Maltby | 280/6 R |
| 2,933,271 | 4/1960 | Maltby | 280/6 R |
| 2,982,080 | 5/1961 | Martin | 56/6 |
| 3,122,379 | 2/1964 | Allenquont | 280/6.1 |
| 3,157,014 | 11/1964 | Bottenberg | 56/6 |
| 3,166,880 | 1/1965 | Robinson | 56/6 |
| 3,177,638 | 4/1965 | Johnson | 56/10.6 |
| 3,269,685 | 8/1966 | Wallace | 280/6.1 |
| 3,402,536 | 9/1968 | Hale et al. | 56/11.9 |
| 3,408,798 | 11/1968 | Hale et al. | 56/11.9 |
| 3,418,790 | 12/1968 | Whitfield et al. | 56/6 |
| 3,539,197 | 11/1970 | Remaud | 280/104 |
| 3,630,010 | 12/1971 | Rester | 56/15.8 |
| 3,670,834 | 6/1972 | Rogers | 180/41 |
| 3,712,404 | 1/1973 | Walquist | 180/212 |
| 3,777,459 | 12/1973 | Elliott | 56/15.3 |
| 3,806,141 | 4/1974 | Louis et al. | 280/6.1 |
| 3,821,990 | 7/1974 | Elmslie | 172/292 |
| 3,953,040 | 4/1976 | Unruh et al. | 280/6.12 |
| 4,041,678 | 8/1977 | Chaney et al. | 56/15.8 |
| 4,313,295 | 2/1982 | Hansen et al. | 56/15.8 |
| 4,316,356 | 2/1982 | Planeta | 56/16.2 |
| 4,416,109 | 11/1983 | Slazas | 56/209 |
| 4,707,971 | 11/1987 | Forpahl et al. | 56/6 |

FOREIGN PATENT DOCUMENTS

| | | | |
|---|---|---|---|
| 1921804 | 11/1964 | Fed. Rep. of Germany | 280/6 H |
| 647148 | 2/1979 | U.S.S.R. | 280/6 H |
| 783059 | 11/1980 | U.S.S.R. | 280/6 R |

OTHER PUBLICATIONS

Excel Industries Inc., "Excel Hustler 602D", Trade Brochure, Copyright 1981.
Dixon Industries, Inc., "Dixon Zero Turning Radius Mowers", Trade Brochure, Cover page & Specification page, Copyright 1982.
D. L. R. Inc., "Slope Marter 662 When Saving Lives Becomes a Factor", Trade Brochure, Publication date unknown.

Primary Examiner—John Weiss
Attorney, Agent, or Firm—Litman, McMahon and Brown

[57] ABSTRACT

A mower vehicle includes a vehicle frame and single front and rear driven wheels. The vehicle is adapted to conform generally to slopes and the like by maintaining the frame in a generally upright orientation. First and second blade housings are pivotally connected to the frame and swingable about an axis extending longitudinally of the frame. The first and second blade housings extend laterally from opposite sides of the frame. Each blade housing carries a driven cutting blade. The blade housings are open to one another and have a shared discharge passage at a center rear section thereof. The blades overlap slightly and rotate in synchronized reverse rotations relative to one another. Hydraulic cylinder assemblies are provided to actuate the first and second blade housings about the longitudinal axis in response to changes in slope of the surrounding terrain. A leveling system is provided for sensing changes in attitude of the vehicle frame, and for consequently actuating the hydraulic assemblies to maintain the vehicle frame in a generally upright position and the first and second blade housings in operative contact with the ground. In an alternative embodiment, wheeled side frames are biased by hydraulic cylinders to maintain the vehicle frame in an upright position and associated blade housings are allowed to float relative to the side frames.

7 Claims, 10 Drawing Sheets

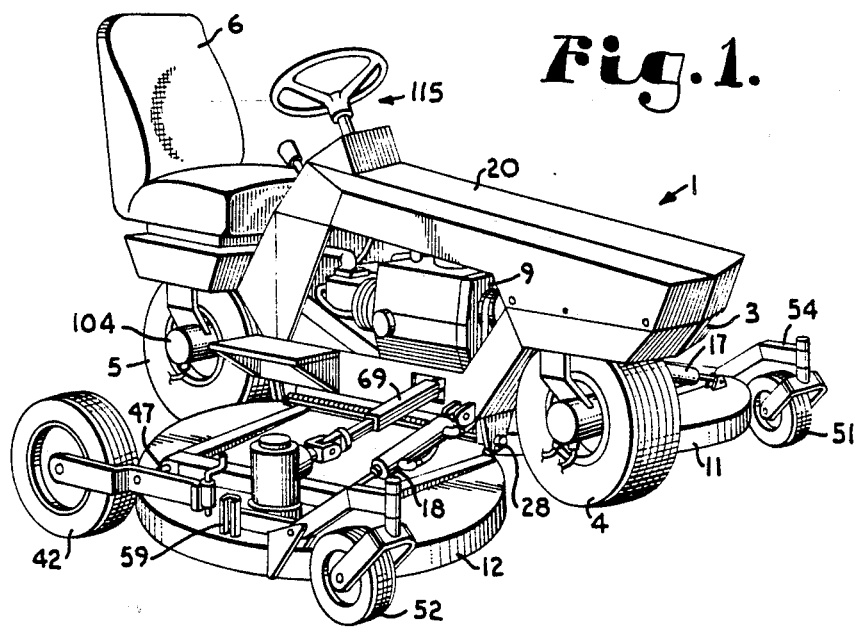
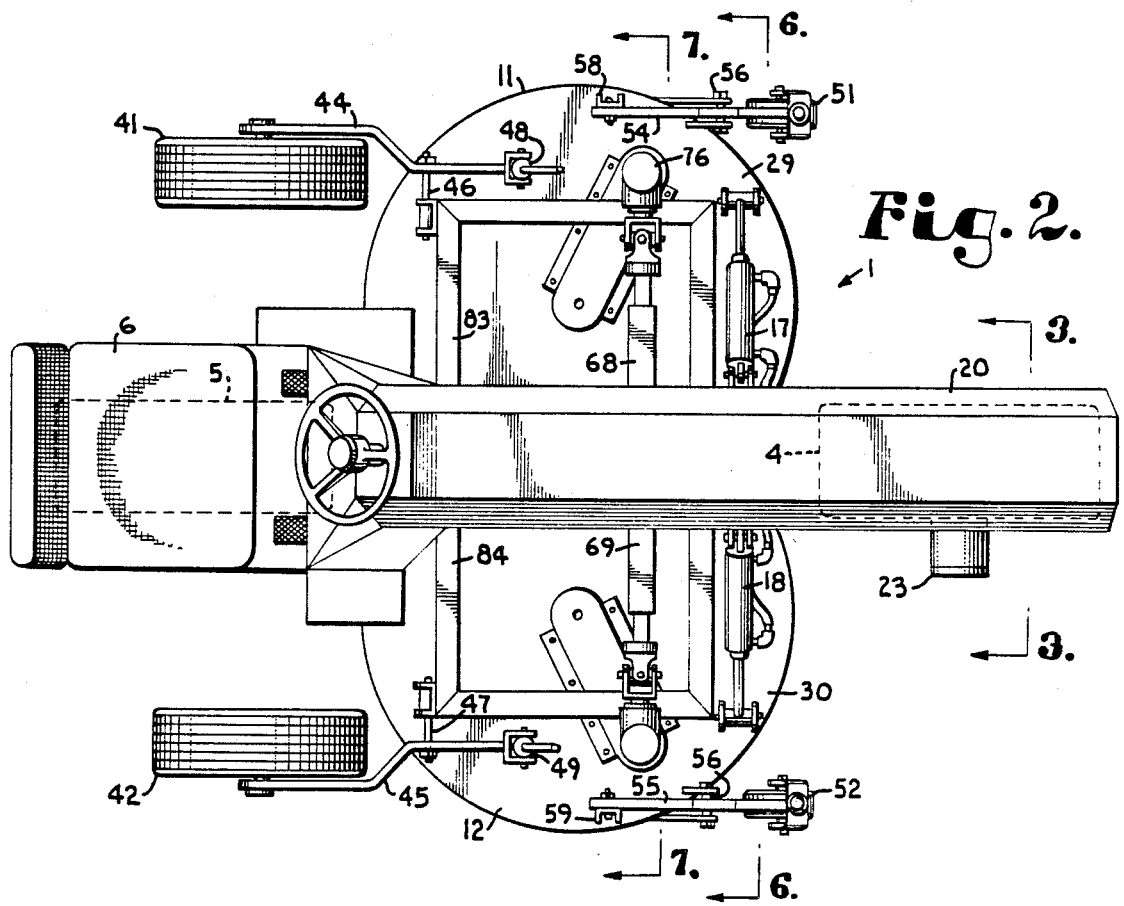

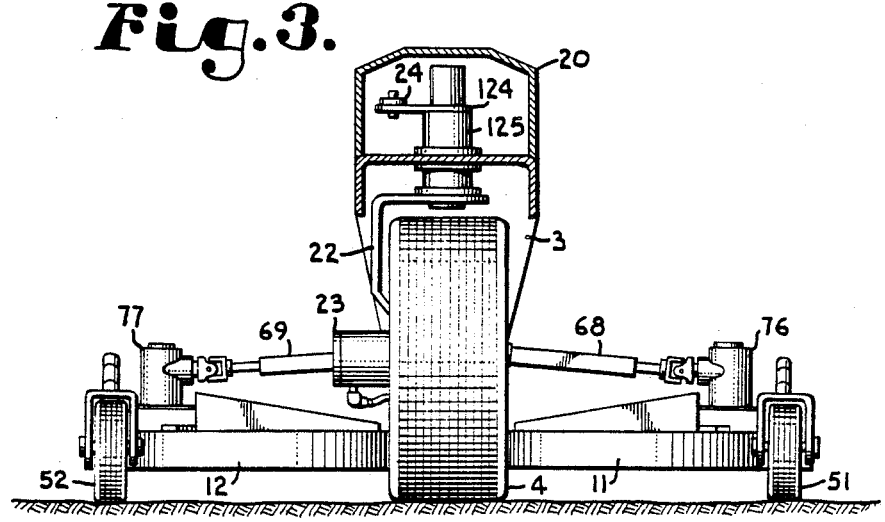
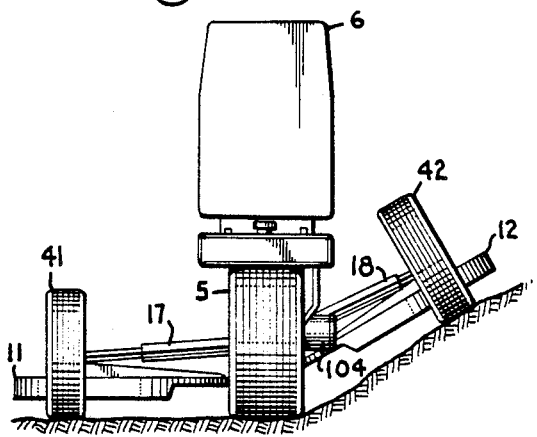
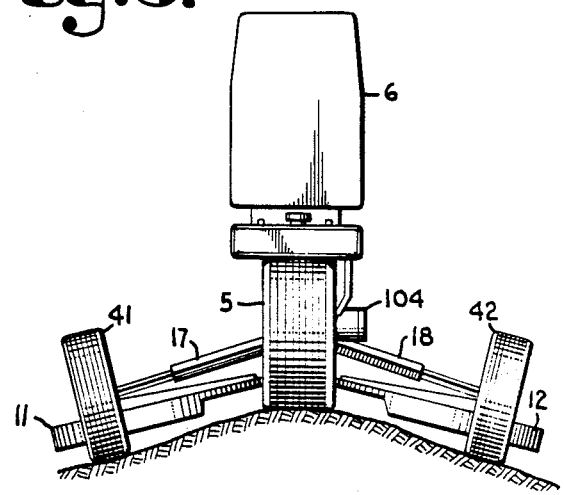
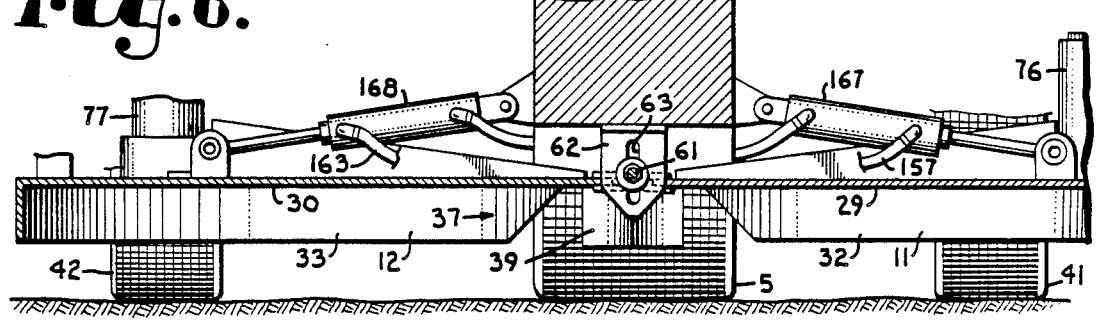

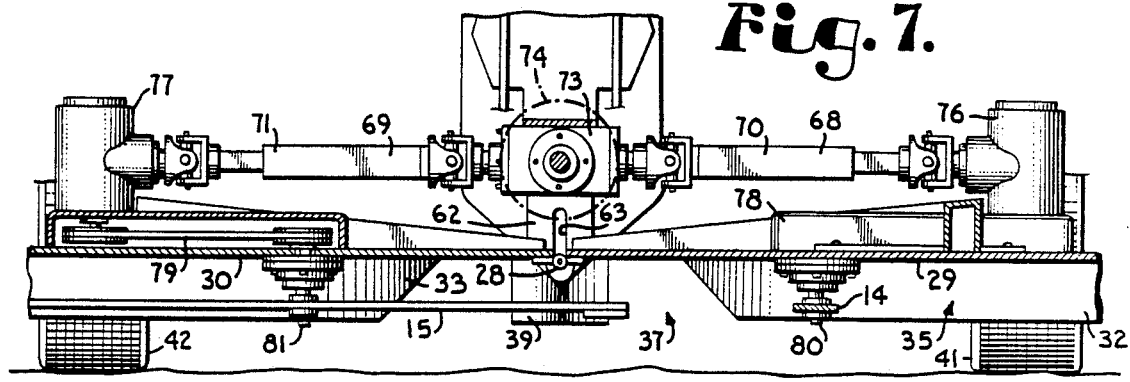
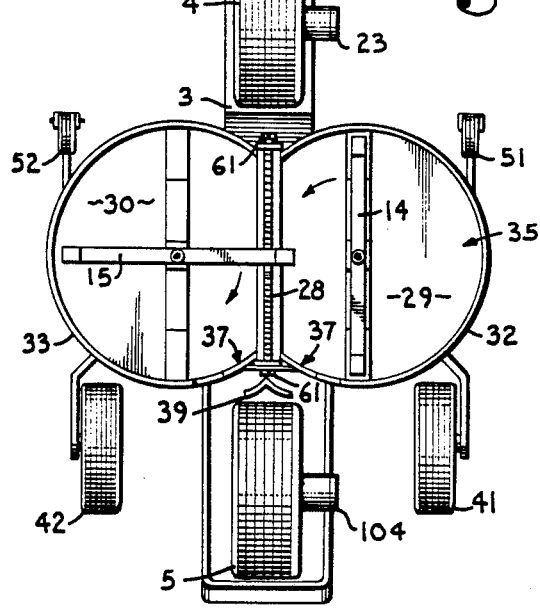
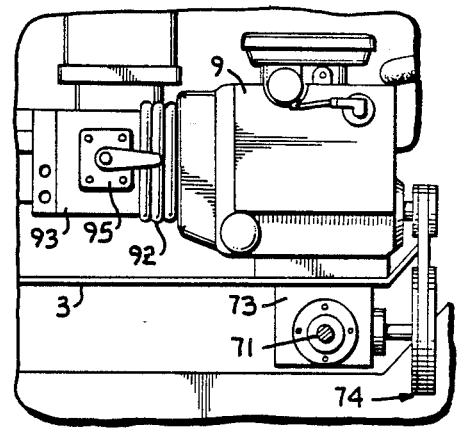
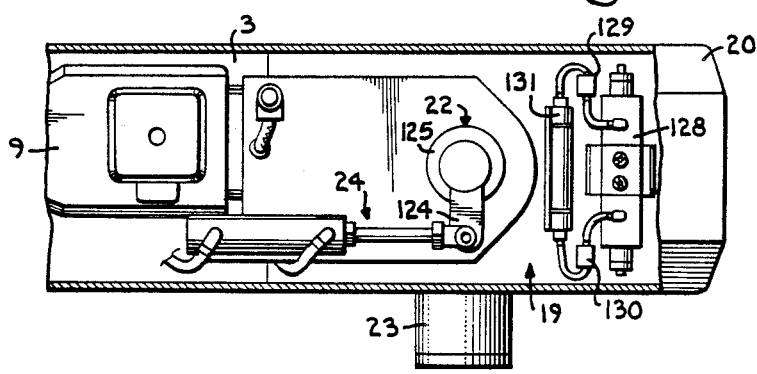

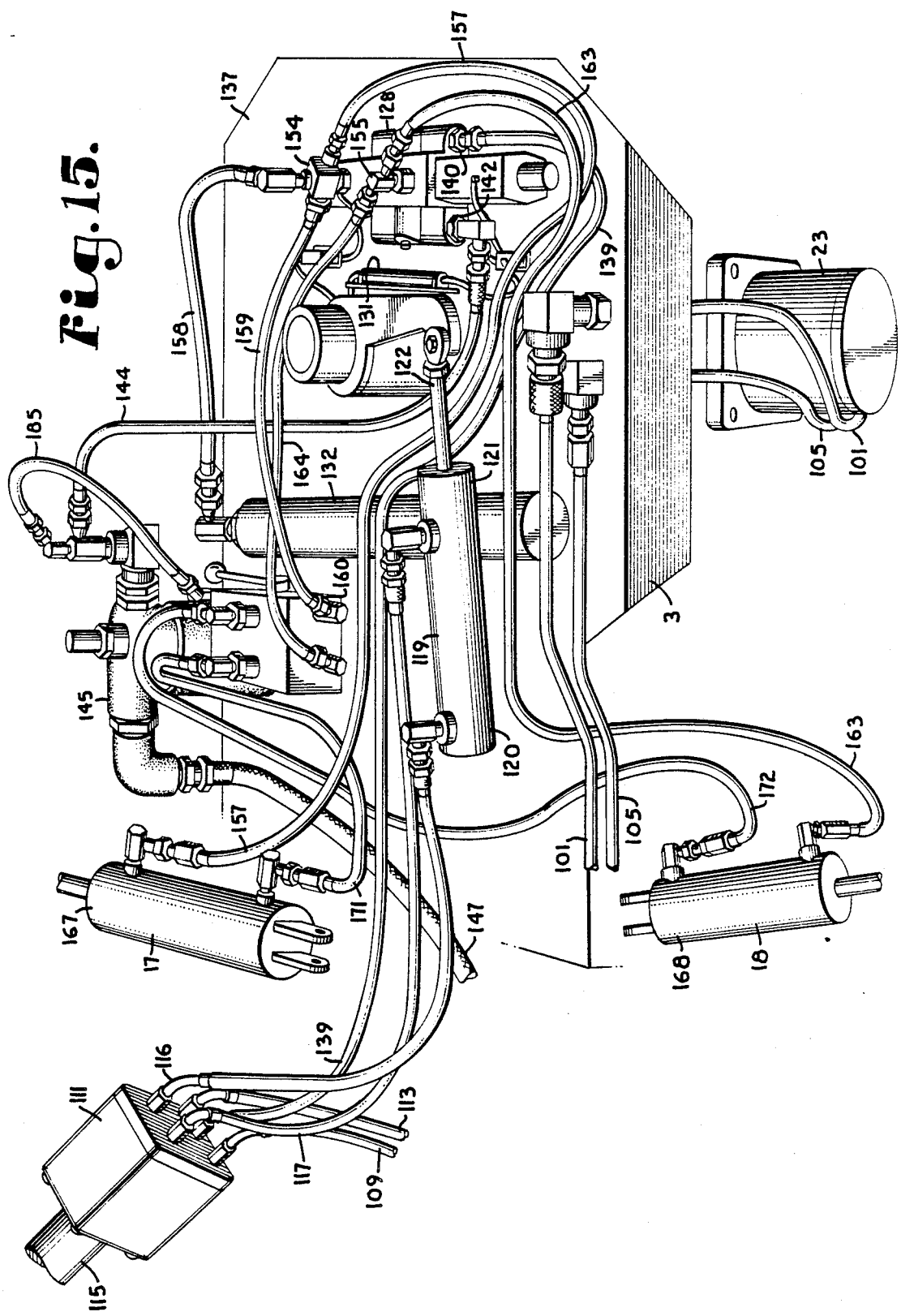

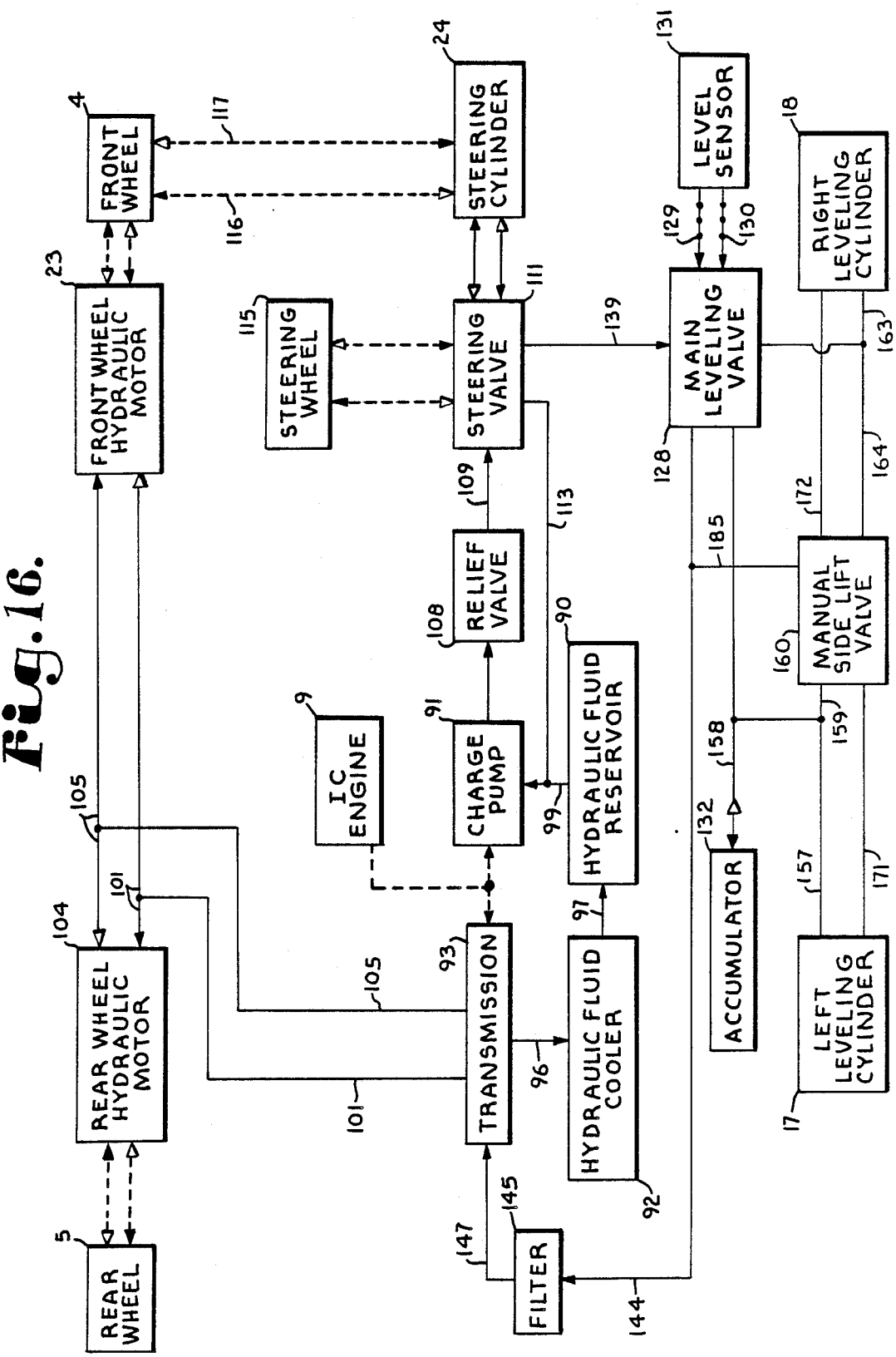

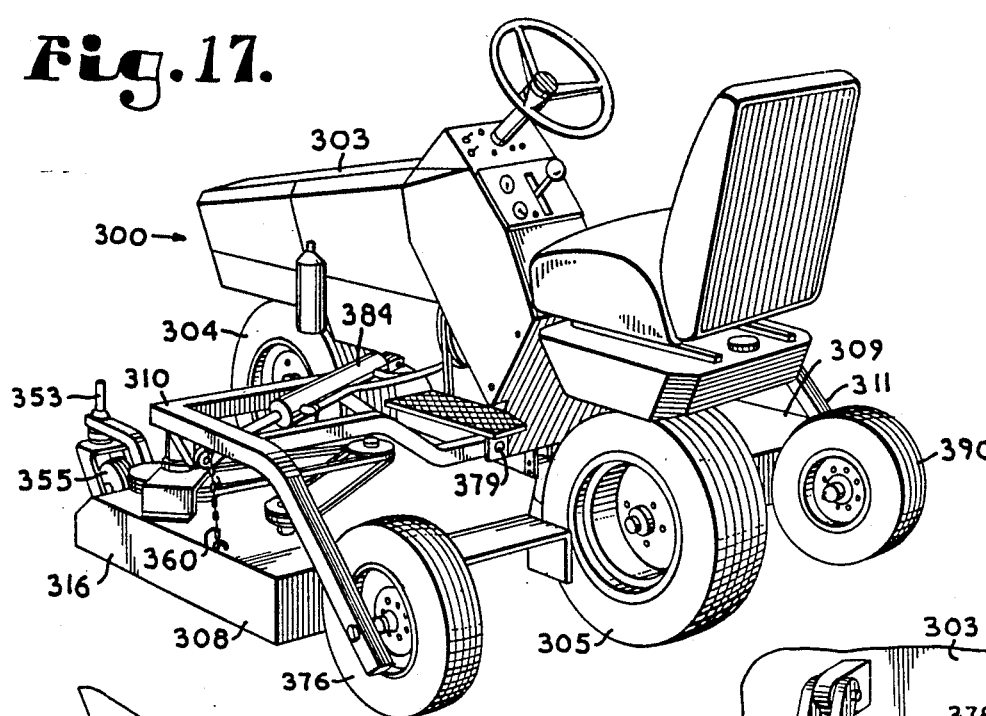
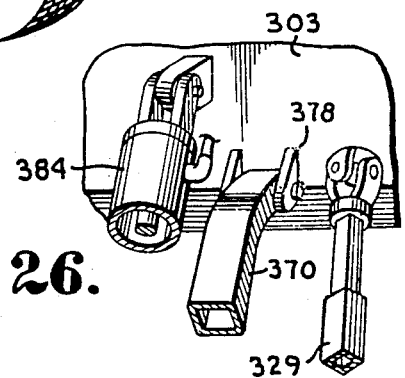
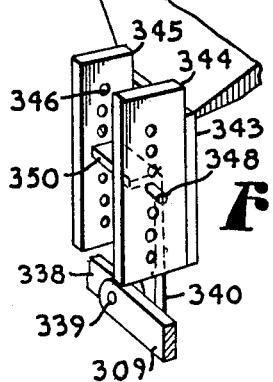
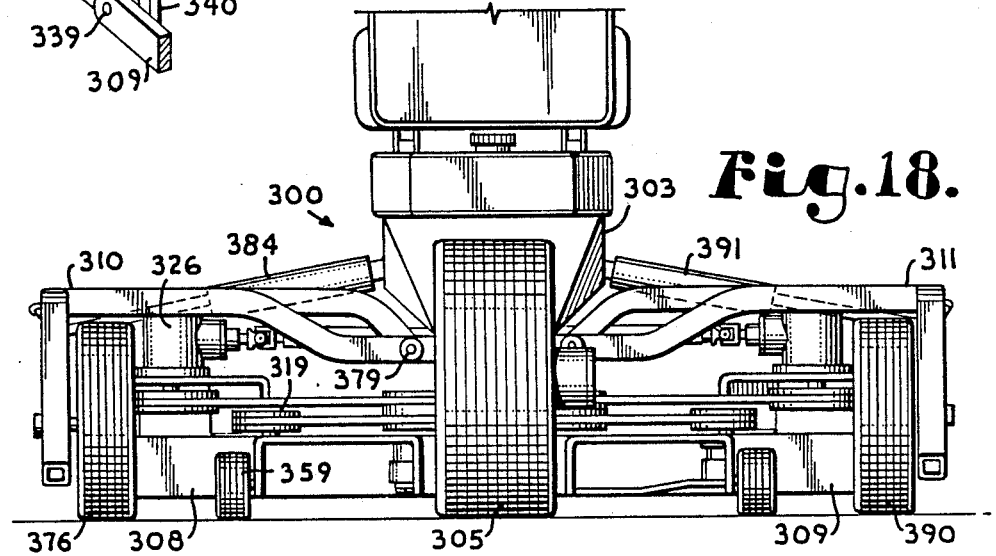

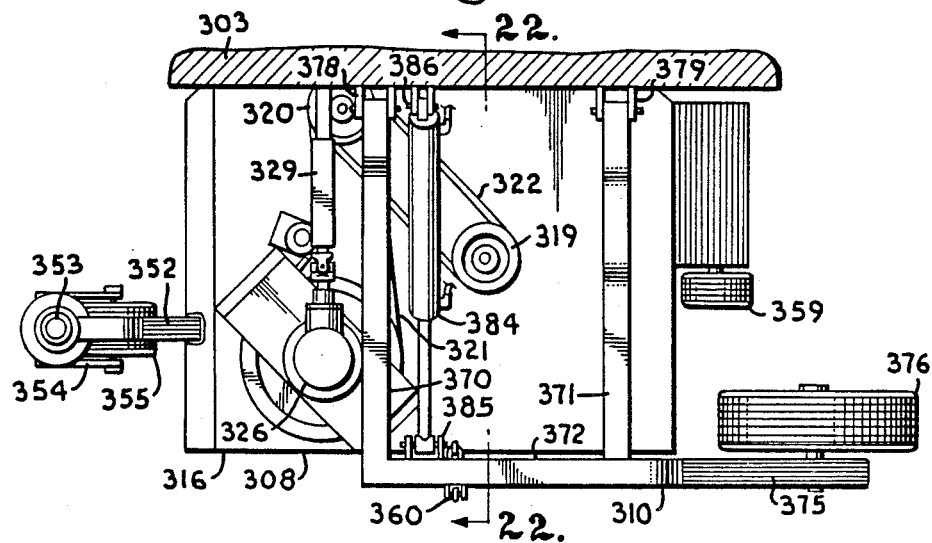
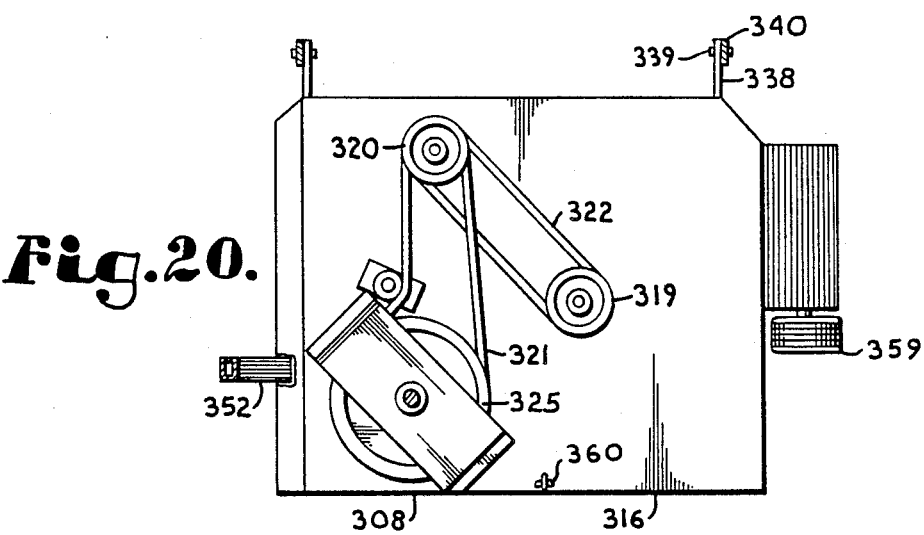
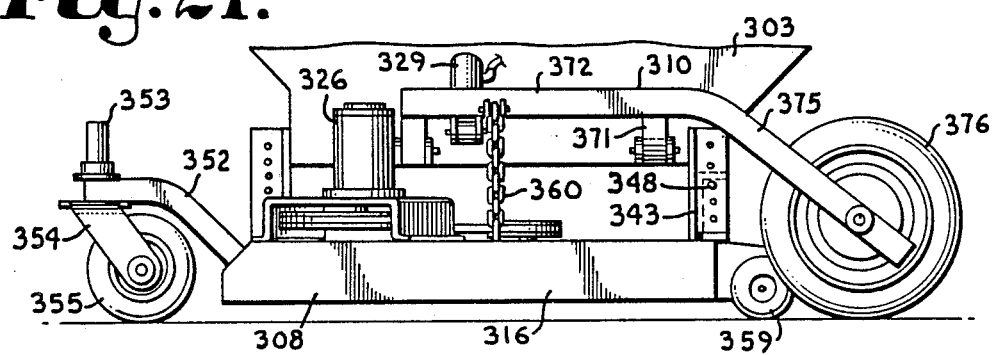

SLOPE MOWER WITH SIDE FRAMES

CROSS-REFERENCE TO RELATED APPLICATION

The present application is a Continuation-in-Part of U.S. Ser. No. 854,102 on Slope Mower filed Apr. 21, 1986, now U.S. Pat. No. 4,707,971.

BACKGROUND OF THE INVENTION

This invention relates to mowing vehicles in general and particularly to such vehicles that are responsive to changes in terrain such that the vehicle body is maintained in a generally vertical orientation.

Mowing vehicles, such as riding lawn mowers and tractors with mowing attachments, have long been used in mowing hillsides, particularly by highway maintenance personnel. Most of these vehicles do not provide means for adapting to changing terrain, such that when a vehicle is on a slope the frame tilts accordingly, which can result in the vehicle tipping over. At the least, there is a dangerous situation, with operators sometimes leaning their bodies toward the upside of the hill in an effort to lower the center of gravity. Prior vehicles have often been adaptations of existing machines involving mechanical actuation of a mower blade assembly to conform to the slope, without significant modification of the vehicle frame such that the frame tilts with the slope. Such embodiments are limited in the degree of slope upon which they can be effectively and safely operated. Other devices have involved three- or four-wheeled vehicle frames with complex actuation of fixed deck blade housings.

Additionally, these complex machines have been expensive, which prohibits many small operators and municipalities from using them. The safety advantages of providing an arrangement whereby the operator always sits vertically even though he is mowing along a sloped embankment are obvious. Heretofore, there has not been a slope mower having a relatively simple leveling system for maintaining the vehicle frame in a vertical orientation, nor has there been such a vehicle having a blade housing arrangement for adapting to variances in the slope of the ground covered by the path of the mower.

OBJECTS OF THE INVENTION

The principal objects of the present invention are: to provide a mower vehicle for mowing sloping hillsides; to provide such a vehicle which has means to maintain the vehicle frame and accordingly, the operator, in a generally vertical or upright orientation; to provide such a vehicle which includes a single front and a single rear wheel; to provide such a vehicle having means for driving each of the front and rear wheels; to provide such a vehicle which has dual blade housings centered on an axis extending longitudinally of the frame and pivotally connected thereto; to provide such a vehicle which has hydraulic assemblies for pivoting the blade housings independently of one another; to provide such a mower vehicle which has a leveling arrangement for actuating the hydraulic cylinder arrangement to maintain each blade housing in operative contact with the ground while maintaining the vehicle frame in a generally vertical orientation; to provide such a vehicle having a hydraulic cylinder arrangement connected to an accumulator device for permitting the blade housings to operate independently of one another; to provide such a vehicle including wheeled side frames pivotally attached to opposite sides of the vehicle and hydraulically biased to maintain such vehicle in an upright orientation and having mower housings floating relative to each side frame; to provide such a vehicle which is relatively simple to use, economical to manufacture, and particularly well adapted to the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

A slope mower includes a vehicle frame and, preferably, single front and rear driven wheels. The vehicle is adapted to maintain the frame in a generally upright orientation. First and second blade housings are pivotally connected to a central section of the frame and are swingable about respective axes extending longitudinally of the frame, and preferably, the blade housings rotate about a single, central longitudinal axis. The first and second blade housings extend laterally to opposite sides of the frame. Each blade housing carries a driven cutting blade, which blades overlap slightly and rotate in synchronized reverse rotations relative to one another. It is envisioned that the blade housings can be modified to carry a reel type cutting assembly. The blade housings are open to one another and have a shared discharge passage at a center rear section thereof. The reverse rotation of just two blades with a central discharge has been found to be an efficient cutting arrangement. A V-shaped divider is provided to direct cut grass away from the path of the rear wheel. This configuration also prevents substantial wind rows.

Hydraulic cylinder and piston rod arrangements are provided to power rotate the first and second blade housings about the central longitudinal axis in response to changes in slope of the surrounding terrain. A leveling system is provided for sensing changes in attitude of the vehicle frame, and for actuating the hydraulic cylinder arrangements to maintain the vehicle frame in a generally upright position, which simultaneously results in the first and second blade housings maintain contact with the ground.

In an alternative embodiment, a pair of side frames are hinged to the vehicle frame with each of the side frames being positioned by an hydraulic ram so as to maintain the vehicle in an upright orientation. Each side member includes an outrigger wheel for travel along the ground surface. A pair of mower housings are floatably mounted beneath respective side frames and hinged to the vehicle. Each mower housing includes a height adjusting trailer wheel on one end thereof and an antiscalping roller on the opposite end. Each mower housing includes a pair of blades positioned such that all four blades of the device cut a width approximately as wide as the device and, in particular, between the two mower housings.

The drawings constitute a part of this specification and include exemplary embodiments of the present invention and illustrate various objects and features thereof.

BRIEF DESCRIPTION OF THE DRAWINGS

FIG. 1 is a perspective view of a slope mower embodying the present invention.

FIG. 2 is a top plan view of the slope mower.

FIG. 3 is a cross-sectional view taken along line 3—3, FIG. 2.

FIG. 4 is a rear elevational view of the slope mower showing one adaptation of the mower to the terrain.

FIG. 5 is a rear elevational view of the slope mower showing a second adaptation of the mower to the terrain.

FIG. 6 is an enlarged, fragmentary, cross-sectional view of the slope mower taken along line 6—6, FIG. 2.

FIG. 7 is an enlarged, fragmentary view of the slope mower taken along line 7—7, FIG. 2.

FIG. 8 is a reduced bottom plan view of the slope mower.

FIG. 9 is an enlarged, fragmentary view of an internal combustion engine and power takeoff assembly of the slope mower.

FIG. 10 is an enlarged, fragmentary top plan view of a front end of the slope mower showing a steering cylinder arrangement.

FIG. 15 is an enlarged, fragmentary, stylized perspective view of the slope mower showing a remainder of the hydraulic system.

FIG. 16 is a schematic diagram of the hydraulic system.

FIG. 17 is a perspective view of a modified slope mower embodying the present invention.

FIG. 18 is an enlarged rear elevational view of the modified slope mower.

FIG. 18 is an enlarged rear elevational view of the modified slope mower.

FIG. 19 is an enlarged and fragmentary bottom plan view of the modified slope mower, showing one mower housing.

FIG. 20 is an enlarged and fragmentary top plan view of the modified slope mower, showing one mower housing.

FIG. 21 is an enlarged and fragmentary side elevational view of the modified slope mower, showing one mower housing.

FIG. 26 is an enlarged and fragmentary perspective view of the modified slope mower, showing drive and pivot mechanisms associated with a mower housing thereof.

FIG. 27 is an enlarged and fragmentary perspective view of the modified slope mower showing height adjustment associated with one of the mower housings.

DETAILED DESCRIPTION OF THE INVENTION

Figure 11:
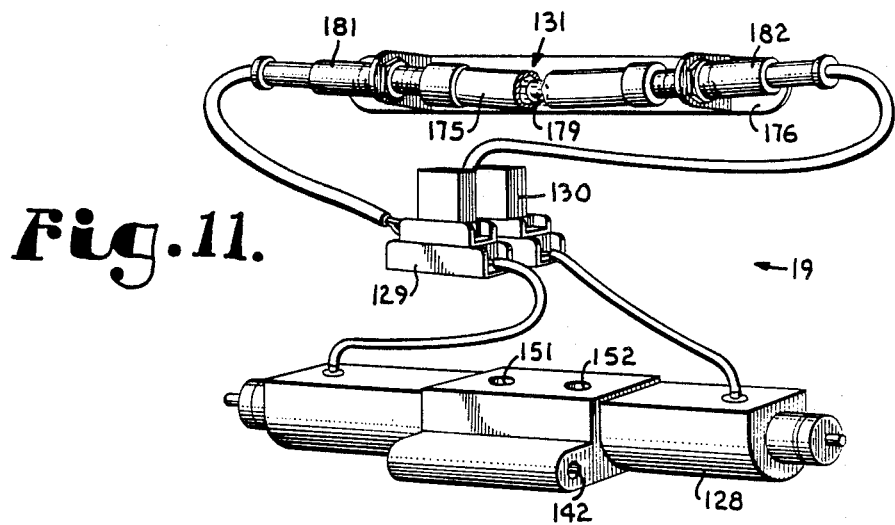
FIG. 11 is an enlarged view of a leveling mechanism of the slope mower.
Figure 12:
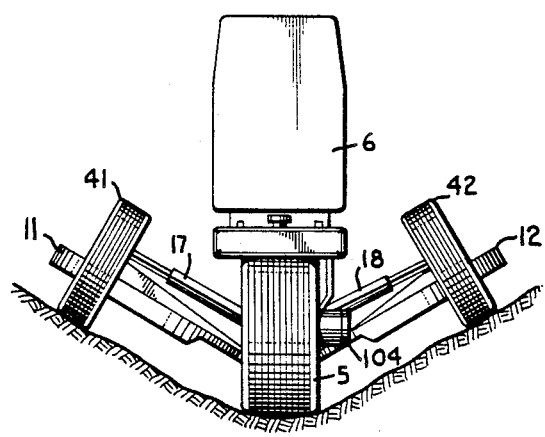
FIG. 12 is a rear elevational view of the slope mower showing another adaptation of the mower to the terrain.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as lifting, but merely as a basis for the claims and as a representative basis for teaching one skilled in the art to variously employ the present invention in virtually any appropriately detailed structure.

Referring in more detail to the drawings:

In FIGS. 1 through 16, the reference numeral 1 refers to a slope mower embodying the present invention. The mower includes a lower vehicle frame 3, a front wheel 4, a rear wheel 5, and operator seat 6. The mower 1 is powered by a prime mover, such as an internal combustion engine 9, which is mounted on the frame 3 and connected to at least one, and preferably both, of the front and rear wheels 4 and 5 for movement across the ground.

A first blade housing 11 is pivotally connected to a central section of the frame 3 and extends to the side of the frame, as seen in FIG. 2. A second blade housing 12 is also pivotally connected to the central section of frame and extends from the other side of the frame 3. Rotatably mounted in respective first and second blade housings 11 and 12 are first and second cutting blades 14 and 15.

Means for pivoting the first and second blade housings 11 and 12 are provided, such as respective first and second hydraulic assemblies 17 and 18, explained in detail below.

The frame 3 is made from sheet metal or the like and includes a cover 20 for shielding various components of the mower 1. The mower 3 exhibits axes extending longitudinally of the frame 3, and generally passing through the front and rear wheels 4 and 5. A central axis A—A extends longitudinally of the frame, but specifically generally divides the frame into two equal sections. Thus, the mower 1 is generally divided into first and second, or left and right, sections having generally corresponding parts on either side of the mower 1. The terms "left" and "right" are used in their normal context when looking toward the front of the mower 1.

A leveling mechanism 19 is operatively connected to the first and second hydraulic assemblies 17 and 18. The leveling mechanism 19 senses changes in the attitude or vertical orientation of the frame 3, and selectively actuates one or both of the first and second hydraulic assemblies 17 and 18 to maintain the frame 3 in a generally upright position. This enables the blade housings 11 and 12 to maintain ground contact, while the frame (and operator) remain vertically oriented. As illustrated, the leveling mechanism 19 is connected to the overall hydraulic system, which is discussed in detail below.

As illustrated, a single front wheel 4 is connected to a front section of the frame 3 by a steering mechanism 22 and is driven by a first hydraulic motor 23. The steering mechanism 22 is connected to a hydraulic steering cylinder assembly 24, as illustrated in FIGS. 3 and 10.

The first and second blade housings 11 and 12 are illustrated as being pivotally connected at a hinge 28, which lies along the central axis A—A. Although the blade housings are illustrated as being connected along the central axis, it is envisioned that the first blade housing 11 could be pivotally connected to the frame 3 along a longitudinal axis at or near the central axis, with a similar situation being true for the second blade housing 12. This would likely result in two hinge connections running generally parallel to one another near the central axis A—A, but along respective horizontally spaced longitudinal axes.

Each blade housing 11 and 12 has a respective top plate 29 and 30. Each top plate 29 and 30 is substantially circular in shape, with the respective first and second cutting blades 14 and 15 rotatably mounted to the respective top plate 29 and 30 at centers thereof. As is seen in FIG. 8, each of the blade housings 11 and 12 (and top plates 29 and 30) are truncated in their circular shapes such that the hinge 28 generally defines a chord across the top plates 29 and 30.

Each of the top plates 29 and 30 has a depending side wall 32 and 33 at a respective periphery thereof. The depending side walls 32 and 33 do not extend along the hinge 28; thus, the blade housings 11 and 12 are open to each other, forming a single blade housing cavity 35. The first and second side walls 32 and 33 do not extend totally along the circumferential periphery of the respective first and second top plates 29 and 30, but are truncated at a point near the center axis A—A and toward the rear of the blade housings 11 and 12, as seen in FIGS. 6, 7, and 8. The truncation creates a discharge opening 37 near the rear wheel 5 for permitting blade cuttings, such as weeds, grass, and the like, to be expelled from the blade housing cavity 35 during operation of the vehicle.

A divider member 39 is attached to the hinge 28 at a rear end thereof, as seen in FIG. 8. The divider member 39 is generally V-shaped with the point of the V-shape being attached to the hinge 28. Thus, the divider member extends rearwardly of the hinge 28 toward the rear wheel 5 and serves to prevent significant amounts of blade cuttings to be discharged under the rear wheel 5 as the mower 1 is operated.

First and second outrigger wheels 41 and 42 are adjustably connected to the first and second blade housings 11 and 12, respectively. The outrigger wheels 41 and 42 provide outer support for the blade housings 11 and 12 for maintaining them in an elevated position above the ground. The outrigger wheels 41 and 42 generally extend to the rear of the blade housings 11 and 12, but are preferably positioned slightly forward of the forwardmost point of the rear wheel 5. In practice, a two inch differential in longitudinal spacing has been found to be an aid in steering the slope mower 1 by reducing the tendency of the mower 1 to wander from a given path during mowing. The outrigger wheels 41 and 42 are pivotally connected to the first and second blade housings 11 and 12, respectively, by first and second linkage members 44 and 45, respectively. Each linkage member 44 and 45 is pivotable about a respective first and second pivot pin, 46 and 47, as seen in FIG. 2. One end of each linkage member 44 and 45 is connected to its respective outrigger wheel 41 and 42. First and second jackscrews 48 and 49 are connected to the other ends of the first and second linkage members 44 and 45, respectively. The first and second jackscrews 48 and 49 are used to adjust the height at which the blade housings 11 and 12 are held above the ground. Additional adjustment mechanisms are included to accomplish this operation, as detailed below.

The first and second blade housings 11 and 12 are also equipped with first and second caster wheels 51 and 52, respectively. Suitable first and second linkage arms 54 and 55 connect the first and second caster wheels 51 and 52, respectively, to the associated blade housings 11 and 12. The linkage arms 54 and 55 are connected to the respective first and second blade housings 11 and 12 at pivot pins 56, as seen in FIG. 2. The caster wheels 51 and 52 are connected to one end of the respective first and second linkage arms 54 and 55. Respective first and second height adjusters 58 and 59, mounted on respective first and second blade housings 11 and 12, are connected to another end of the first and second linkage arms 54 and 55. The linkage arms 54 and 55 can be pivoted about the pins 56 to vary the height of the caster wheels 51 and 52. The height adjusters 58 and 59 are used to lock the caster wheels 51 and 52 in a rough position relative to the blade housings 11 and 12. The caster wheels are not used for transport of the mower 1, but rather, are used to prevent scalping of the ground when a slope or embankment is encountered. Thus, only rough positioning of the caster wheels 51 and 52 is required.

Additional height adjustment means are included in addition to the linkage member and jackscrew combinations associated with the first and second outrigger wheels 41 and 42. These means include an arrangement associated with the hinge 28, including a locking nut assembly 61 releasably connected to the hinge 28, as seen in FIG. 6. A pair of locking nuts 61 are provided, at the front and rear ends of the hinge 28, and each cooperates with a corresponding tab 62 depending from the frame 3, as seen in FIGS. 6-8. Each tab is provided with a slot 63, through which the locking nut assembly 61 extends in a manner such that the blade housings 11 and 12 and the hinge 28 can be raised and lowered within the slots 63 and held in place by the locking nut assemblies 61 in order to adjust the relative height of the cutting blades 14 and 15 to the ground. When the locking nut assemblies 61 are used in connection with the jackscrews 48 and 49, both the center of the blade housings 11 and 12 and the outer sections thereof can be adjusted together to maintain a level cutting path of the blades 14 and 15.

In order to power rotate the cutting blades 14 and 15, first and second power take-off assemblies 68 and 69 are provided. The power take-off assemblies 68 and 69 each include a rotatable shaft 70 and 71 having one end connected to a gear box 73, which is shared by the shafts 70 and 71, as seen in FIG. 7. The gear box 73 is connected to the internal combustion engine 9 by a belt drive system 74, as well-known in the art and as illustrated in FIG. 9. Outer ends of the rotatable shafts 70 and 71 are connected to respective first and second cutting blade gear boxes 76 and 77. The rotational input of the shafts 70 and 71 is translated through the gear boxes 76 and 77 to respective first and second cutting blade belt drive assemblies 78 and 79, which rotate first and second cutting blade spindles 80 and 81, which in turn receive the first and second cutting blades 11 and 12 and rotate same.

As seen in FIG. 8, the first and second cutting blades have overlapping paths, and they are placed approximately 90 degrees out of phase to avoid contact and to synchronize their rotations. Because they are connected to a mutual gear box 73, the power take-off assemblies 68 and 69 rotate the blades at the same speed, such that the blades 14 and 15 should never contact each other during operation. As is also evident from FIG. 8, the blades 14 and 15 have reverse rotations, such that each generally sweeps from front to rear as it moves toward and then away from the hinge 28. This configuration results in the cut grass being efficiently expelled from the blade housings 11 and 12 through the discharge opening 37. Generally speaking, the first cutting blade 14 has a clockwise directional path when viewed from the top, and the second cutting blade 15 has a generally counter clockwise directional path when viewed from the top. When viewed from the bottom, as in FIG. 8, the reverse characterizations are true. Although cutting blades 14 and 15 are described herein, it is foreseen that alternative cutting means, such as reel type cutting assemblies, can be provided.

The blade housings 11 and 12 are provided with reinforcing members 83 and 84 for structural support.

The hydraulic system of the present invention includes a fluid reservoir 90, a charge pump 91, a hydraulic fluid cooler or radiator 92, and a transmission 93. In describing the various components of the hydraulic system, a plurality of fluid lines will be referred to, all of which are connected to their respective components by appropriate fittings and the like.

The charge pump 91 and transmission 93 are mechanically connected to and driven by the internal combustion engine 9 in a manner well-known in the art. The transmission 93 is operatively connected to the charge pump 91 for providing forward, reverse, and neutral power modes for the front and rear wheels 4 and 5. A gear selector 95 is provided for this purpose, FIG. 9. The fluid cooler 92 is connected to the transmission 93 by a fluid line 96 and serves to cool the hydraulic fluid during operation. A fluid line 97 recycles the hydraulic fluid from the cooler 92 to the fluid reservoir 90. The charge pump 91 draws hydraulic fluid from the fluid reservoir 90 through fluid line 99.

The charge pump pressurizes the hydraulic fluid in the system up to approximately b 90 pounds per square inch gauge (psig) for use in powering the front and rear wheels 4 and 5. The charged fluid is transmitted from the charge pump 91 through the transmission 93 to fluid line 98. The hydraulic fluid is pumped from the transmission 93 through a fluid line 101, which tees for connection both to the first hydraulic motor 23 and a second hydraulic motor 104. The fluid line 101 is connected to respective inlet ports to the hydraulic motors 23 and 104. The charged fluid powers the hydraulic motors 23 and 104 and is discharged therefrom through discharge ports into a fluid return line 105. The return line 105 is teed similarly to the fluid line 101 such that fluid returning from each of the hydraulic motors 23 and 104 returns finally to the transmission 93 through a single source. Appropriate control means are provided for regulating the flow of fluid through line 101 and return line 105 for powering the front and rear wheels 4 and 5. The wheels are connected in parallel, such that an automatic differential system is provided, whereby the hydraulic motor 23 or 104 that has the lower torque thereon will pull or push the mower 1 as the case may be. It is envisioned that alternative means for driving the wheels 4 and 5 could be provided to power both wheels.

Fluid for the leveling mechanism 19 and steering mechanism 22 is discharged from the charge pump 91 through a relief valve 108, which is connected to a fluid line 109. A downstream end of the fluid line 109 is connected to a steering valve 111, which is part of the steering mechanism 22. It is noted that the fluid in the line 109 is "precharged" fluid, in that it is discharged from the charge pump 91 prior to full charging (to 90 psig) of the fluid that is required for operation of the hydraulic motors 23 and 104. It can be seen in FIG. 14 that a return line 113 from the steering valve 111 discharges at a downstream end into the fluid line 99 from the reservoir to the charge pump. Thus, the leveling mechanism 19 and steering mechanism 22 are operated by utilizing the same fluid as does the hydraulic motors 23 and 104, but a lower pressure in the lines is adequate.

The steering valve 111 is operated through rotation of a steering wheel assembly 115 in a known manner. The steering valve 111 is connected by a primary fluid line 116 and secondary fluid line 117 to the hydraulic cylinder steering assembly 24. The hydraulic cylinder steering assembly 24 includes a cylinder 119 having a first end 120 and a second end 121. Disposed within the cylinder 119 is a piston, as is well-known in the art, but not shown in the figures. The piston is attached to a piston rod 122, which extends through packing in the cylinder second end 121. The piston separates fluid in communication with the primary fluid line 116 at the cylinder first end from fluid end communication with the secondary fluid line at the cylinder second end. The piston and piston rod actuate according to movement of the hydraulic fluid through the primary and secondary fluid lines 116 and 117.

The piston rod 122 extends through a packing in the cylinder second end, and an outer end of the piston rod 122 is attached to the steering mechanism 22, which includes a crank arm 124 attached to a spindle assembly 125. Actuation of the piston rod 122 in response to increased pressure in either the primary or secondary fluid lines 116, 117, results in movement of the spindle assembly 125, and ultimately in movement of the front wheel 4.

The steering valve 111 is responsive to rotation of the steering wheel assembly 115 to use pressurized fluid from the fluid line 109 to pressurize either the primary fluid line 116 or secondary fluid line 117, depending on the direction in which the wheel assembly 115 is turned. For example, if the operator desires to turn left, as referenced by a normal sitting position on the seat 6, the wheel is turned counter clockwise. The steering valve 111 opens the primary fluid line 116 to pressure, whereby fluid is forced into the cylinder first end 120, moving the piston and piston rod 122 outwardly and forcing fluid out of the cylinder second end 121 into the secondary line 117. As the piston rod is extended away from the cylinder 119, the crank arm 124 and spindle assembly 125 are rotated generally counter clockwise, which actuates the steering mechanism 22 to turn the wheel to the left. To make a right turn, the reverse is true, such that pressurized fluid is forced through the secondary fluid line 117 into the cylinder second end 121, forcing the piston and piston rod 122 toward the cylinder first end. This forces fluid out of the cylinder first end 120 and turns the crank arm 124, spindle assembly 125, and overall steering mechanism 22 to the right.

The leveling mechanism 19 comprises a main leveling valve 128, relay switches 129 and 130, level sensor 131, and accumulator cylinder 132. As illustrated in FIG. 16, these components are located in a front section 137 of the frame 3. A fluid line 139 connects the steering valve 111 to the main leveling valve 128, entering through an inlet port 140. The main leveling valve 128 is an electric valve of the type well-known in the art for responding to electrical impulses to open and close various ports. The valve 128 has an outlet port 142, to which is connected a fluid line 144. The fluid line 144 connects the outlet port 142 to an oil filter assembly 145. In turn, the oil filter assembly 145 is connected to the transmission 93 by a fluid return line 147.

Figure 14:
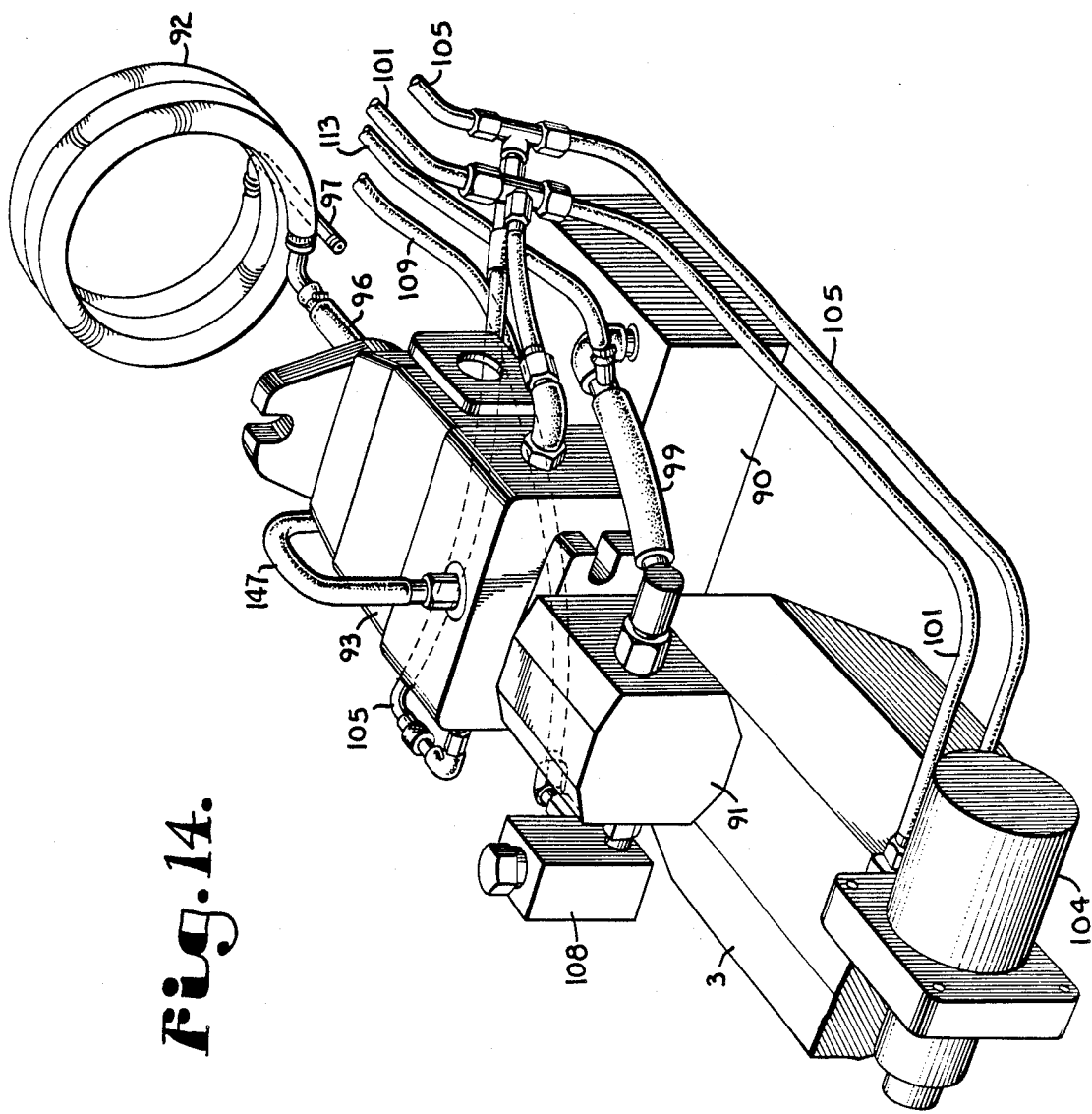
FIG. 14 is an enlarged, fragmentary, stylized perspective view of the slope mower illustrating the hydraulic system.
Figure 22:
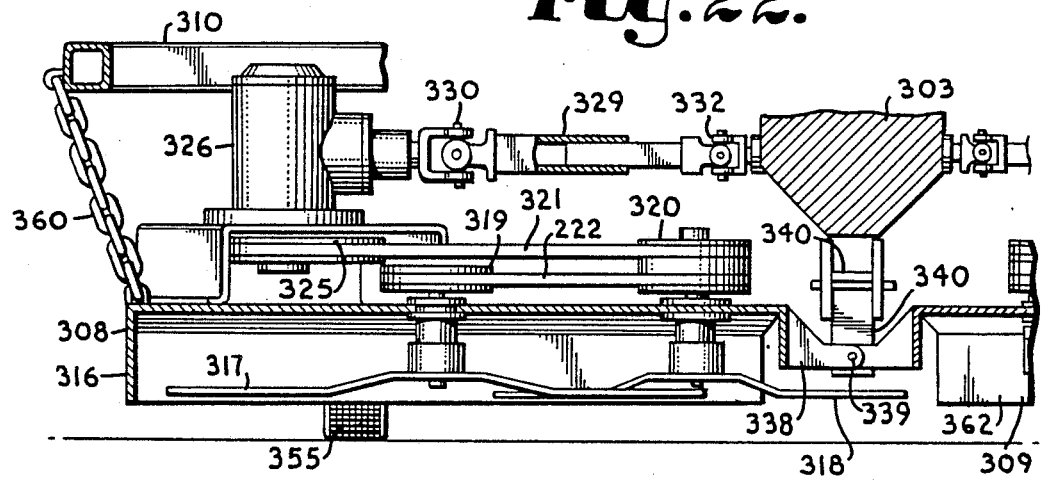
FIG. 22 is an enlarged and fragmentary cross-sectional view of the modified slope mower, taken along line 22—22 of FIG. 19.

It can be seen from the schematic diagram in FIG. 16 and the stylized perspectives in FIGS. 14 and 15, that fluid can flow in a circuit from the charge pump 91 through the steering valve assembly 111, the main leveling valve 128, the filter 145, and the transmission 93, back to the charge pump 91. To accomplish this, the steering valve 111 simply allows the hydraulic fluid to flow through it, when the steering mechanism 22 is not in use, and to the main leveling valve 128. When the steering mechanism 22 is used, the steering valve 11 diverts at least a portion of the fluid through the primary and secondary fluid lines 116 and 117 for operation of the steering mechanism.

When the mower 1 is in an equilibrium position such that no adjustment of the first and second hydraulic assemblies 17 and 18 is necessary, the leveling valve 128 operates to direct the fluid from the inlet port 140 and out the outlet port 142 onto the filter assembly 145 for return to the transmission 93 and charge pump 91. In this situation, the fluid is merely recirculated through the system until such time as a leveling operation is required.

The main leveling valve 128 has a first auxiliary port 151 and a second auxiliary port 152. The first auxiliary port 151 is connected to a four-way cross member 154 for permitting flow from the first auxiliary port 151 to three other components discussed below. The second auxiliary port 152 is equipped with a tee member for allowing flow to two other components.

The four-way cross member 154 permits flow communication from the first auxiliary port 151 to the first, or left, hydraulic assembly 17. Flow communication is provided to the accumulator cylinder 132 from the cross member 154 through a fluid line 158. Lastly, flow communication is provided from the cross member 154 to a manual side lift valve assembly 160 through a fluid line 159.

Flow communication is provided between the tee member 155 and the second, or right, hydraulic assembly 18 through a fluid line 163. A fluid line 164 connects the tee member 155 to the manual side lift valve assembly 160.

The first and second hydraulic assemblies 17 and 18 (also referred to as left and right hydraulic assemblies, respectively) each comprise a first, or left, leveling cylinder 167 and a second, or right, leveling cylinder 168, each having appropriate connecting lugs and piston and piston rod assemblies as are well-known in the art. As best seen in FIGS. 2 and 6, the leveling cylinder lugs are pivotally connected to the mower frame 3, and piston rod free ends are pivotally connected to the blade housings 11 and 12, respectively. The leveling cylinders 167 and 168 are connected to their respective blade housings 11 and 12 in a manner known in the art such that actuation of the piston rods pivots the respective blade housings about the central hinge 28.

The fluid line 157 is connected to an outer end of the first leveling cylinder 167 for regulating hydraulic fluid flow to the cylinder on one side of the cylinder piston. A fluid line 171 connects an inner end of the first, or left, leveling cylinder to a manual side lift valve 160. When the manual side lift valve 160 is in a neutral position, fluid can flow from the tee member 155, through line 164, the side lift valve 160, and into the fluid line 171 for communication with the first leveling cylinder 167 on the other side of the cylinder piston.

The fluid line 163 connects an outer end of the second, or right, leveling cylinder 168 to the tee member 155. Thus, fluid can flow from the tee member 155 into the outer end of the second leveling cylinder 168 on one side of the cylinder piston. Fluid flow from an inner end of the second leveling cylinder 168, and thus from the other side of the cylinder piston, is established through a line 172 to the side lift valve assembly 160. When the side lift valve assembly 160 is in a neutral position, flow communication is established between the inner end of the leveling cylinder 168 and the cross member 154 through fluid line 172, the manual side lift valve 160, and finally the fluid line 159.

As is evident from the drawings, the tee member 155, when the side lift valve 160 is in its neutral position, allows for fluid flow between the second auxiliary port 152 and, simultaneously, the outer end of the second leveling cylinder 168 and the inner end of the first leveling cylinder 167. Thus, fluid flow from the second auxiliary port 152 through the tee member 155 simultaneously acts on an inner side of the cylinder piston in the first leveling cylinder 167 and an outer side of the cylinder piston in the second leveling cylinder 168.

It can also be seen from the drawings, particularly FIG. 16, that simultaneous flow is possible from the first auxiliary port to the outer end of the first leveling cylinder 167, the inner end of the second leveling cylinder 168, and the accumulator 132. The level sensor 131 is provided to actuate the electric main leveling valve 128. The leveling valve 128 responds to electric input from the level sensor 131 to open and close the first and second auxiliary ports 151 and 152 as necessary to level the frame 3, which is to say to keep the frame 3 in a generally vertical orientation.

The level sensor 128 is detailed in FIG. 11, and is electrically connected to the switches 129 and 130, which in turn are electrically connected to opposite ends of the main leveling valve 128. The level sensor comprises a curved tube 175 connected to a support structure 176, which in turn is attached to the frame 3. The tube 175 is illustrated as being filled with a fluid, such as kerosene, and has a steel ball 179 therein. The present tube 175 and ball 179 arrangement also works well if the fluid in the tube 175 is a gas such as air, which makes the sensor respond more quickly. The bottom part of the curve in the tube 175 is at a lower position than either a first end 181 or a second end 182 of the tube 175. Situated in both the first and second ends 181 and 182 are suitable sensors, which are activated upon contact of the ball 179. When the frame 3 shifts either to the right or the left, as when the machine is operated on a slope, the ball 179 will roll to either the first or second end 181, 182 of the tube 175, as the case may be. Upon contacting the associated sensor, an electronic impulse is relayed to the main leveling valve 128, for actuation of the value 128 to open or close the appropriate auxiliary port.

FIGS. 4, 5, 12, and 13 illustrate various slopes that may be encountered during operation of the mower 1. The described valving system is responsive to all such situations to extend or retract the piston rods associated with the first and second leveling cylinders 167 and 168 to maintain the frame 3 in its upright position. The curved tube 175 filled with kerosene has been found to work well with the present invention, but applicants are not limited to a specific means of sensing the orientation of the frame 3. However, it has been found that the illustrated assemblage of components works well in practical use, since the kerosene and ball arrangement is not overly responsive to changes in attitude of the frame 3. For example, it has been found that mercury switches tend to be too responsive, such that the frame 3 undergoes constant shifting, which can be distracting to the operator. The illustrated embodiment permits the frame 3 to shift slightly before it responds, so that changes are more gradual and less distracting to the operator.

Figure 13:
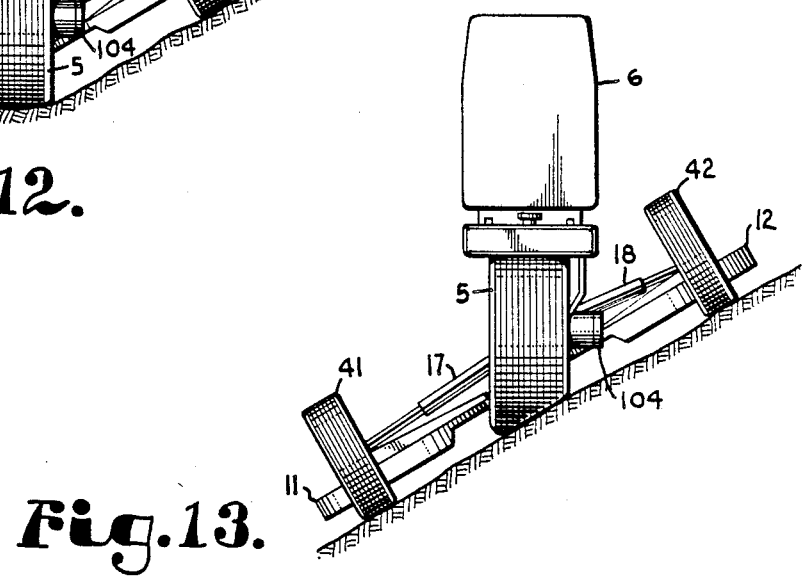
FIG. 13 is a rear elevational view of the slope mower showing another adaptation of the mower to the terrain.

The specific hydraulic valving systems disclosed operate in a manner well-known in the art; thus, it is not necessary to describe each different valving alternative. FIG. 13 illustrates the most common situation, that is, where the mower 1 is being operated on a slope. It has been found that the present invention can be operated on slopes of up to about 30 degrees from the horizontal.

In the situation shown in FIG. 13, as the mower 1 moves into the slope, it will tend to tilt to the left, and the steel ball 179 contacts the sensor associated with the tube first end 181. The electric main leveling valve 128 is actuated to open the second auxiliary port 152, whereby pressurized fluid is forced into line 163, and line 171 (via line 164), which tends to retract the piston rod associated with the right leveling cylinder 168, and extend the piston rod associated with the left leveling cylinder 167. Fluid is simultaneously forced through line 171 into line 159 and cross member 154. At the same time, fluid from the left leveling cylinder 167 is being forced through line 157 to the cross member 154. This fluid exits through line 144.

The accumulator 132 in this instance provides an amount of spring, to cushion the transference of the fluid. The accumulator 132 is charged with an inert gas, such as nitrogen, and has a piston therein. In the piston's expanded position, the accumulator has an amount of pressure approximately equal to the pressure in the overall hydraulic leveling system, which is about 90 psig. However, the accumulator can be compressed such that the pressure therein is on the order of 600 psig. Excess oil generally is forced into the accumulator when both blade housings 11 and 12 are pulled up, as in FIG. 12.

It can be seen that by appropriate movement of the leveling valve 128, in response to the level sensor 130, the first and second hydraulic assemblies 117 and 118 are retracted or extended as necessary to maintain the blade housings 11 and 12 in contact with the ground, and the frame 3 in a generally upright position.

The manual side lift valve 160 is provided to override the leveling system so as to force a selected one of the blade housings 11 and 12 into an elevated position, such as for changing an associated cutting blade 14 and 15. The manual side lift valve 160 is connected to the filter 145 through a fluid line 185 for recycling of excess oil during a side lifting operation. By appropriate manipulation of the side lift valve 160, the leveling system is overridden, and fluid is forced into one side of a selected leveling cylinder 167, 168, through either line 171, or 172. The side lift valve 160 overrides the natural tendency of the other leveling cylinder to react in unison with the selected leveling cylinder, and said excess oil is displaced through the line 185 to the filter 145 for recirculation.

FIG. 17 through 27 illustrate a first modified embodiment of a slope mower according to the present invention, generally designated by the numeral 300. The slope mower 300 is similar in many respects to the mower 1 and equivalent features will not be discussed in great detail herein.

The slope mower 300 includes a main vehicle frame or body 303, a front wheel 304, a rear wheel 305, a first mower 308, a second mower 309, a first side support frame 310 and a second side support frame 311.

The vehicle body 303 is quite similar to the frame 3 of the previous embodiment and, therefore, will not be discussed in detail. The vehicle body 303 incorporates therein a prime mover or engine of the type described for the previous embodiment.

The first mower 308 includes a housing 316 having a first blade 317 and a second blade 318 rotatably mounted therein. The first and second blades 317 and 318 are driven by pulleys 319 and 320 respectively which are in turn driven by drive belts 321 and 322. In particular the drive belt 321 drives the pulley 320 and the drive belt 322 is driven by the pulley 320 to drive the pulley 319.

The drive belt 321 is in turn driven by a pulley 325 which is driven by a gear reduction device 326 mounted upon the housing 316. The gear reduction device is in turn connected by a drive shaft 329 and by a pair of universal joints 330 and 331 to the prime mover.

The housing 316 is pivotally mounted, on the side thereof closest to the mower body 303, so as to generally rotate about an axis which is parallel to an axis passing through the wheels 304 and 305 and closely spaced relative thereto. In particular the housing 316 is connected by a strut 338 to an axle 339 in turn connected to a height adjustment plate 340. The plate 340 is L-shaped and extends upwardly from the connection thereof with the strut 338. An adjustment structure 343 (see FIG. 27) is fixedly attached to and depends from the bottom of the vehicle body 303 intermediately therealong.

The adjustment structure 343 includes a pair of spaced and vertically aligned plates 344 and 345 each having a plurality of equally spaced and horizontally aligned apertures 346 passing therethrough. A bar 348 of approximately the same diameter as the apertures 346 extends through a pair of the horizontally aligned apertures 346 and can be selectively adjusted and secured in position by an operator along the vertically positioned apertures 346.

An upper section 350 of the adjustment plate 340 extends over the bar 348. In this manner the height of the inner side of the mower housing 316 can be adjusted relative to the height of the mower vehicle body 303. Extending forwardly of the mower housing 316 is a strut 352 having mounted therein a vertical axle 353 supporting a clevis 354 and a freely turning wheel 355. The height of the strut 352 and, consequently, the mower housing 316 at that location is adjustable relative to the wheel 355 by placement of washers and the like between the strut 352 and clevis 354, so as to adjust the outer mowing height of the first mower 8. An antiscalping wheel or roller 359 is pivotally attached to the mower housing 316 near the outer end thereof opposite the wheel 355. A chain 360 loosely supports the housing 316 beneath the first side support frame 310.

Figure 23:
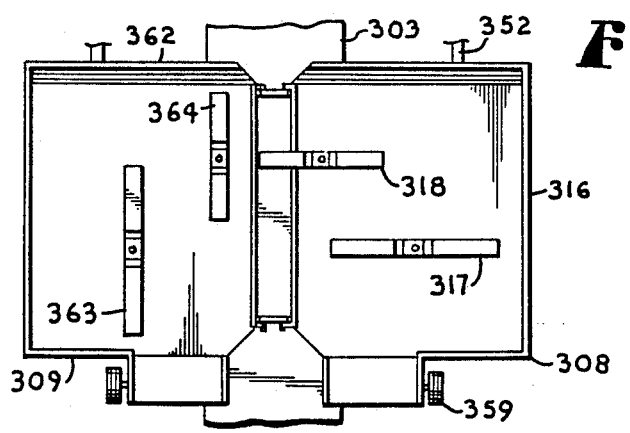
FIG. 23 is a fragmentary bottom plan view of the modified slope mower, showing mower housings thereof.
Figure 24:
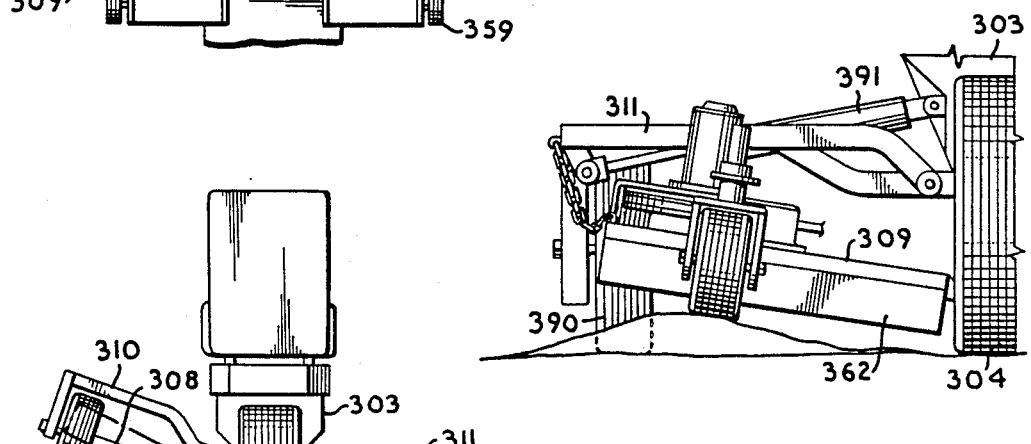
FIG. 24 is a fragmentary and enlarged front elevational view of the modified slope mower, showing one mower housing and side frame thereof adapting to terrain.
Figure 25:
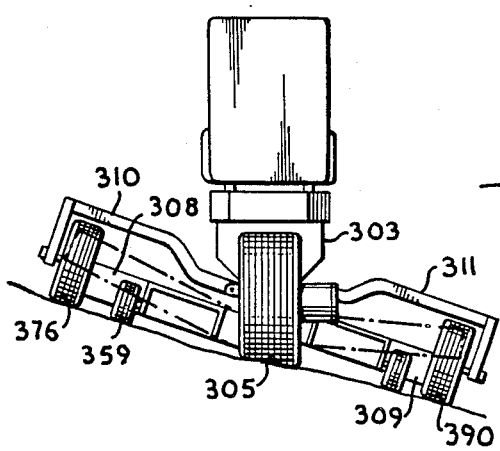
FIG. 25 is a rear elevational view of the modified slope mower on a reduced scale, showing the mower housings and vehicle frame thereof adapting to terrain.

The second mower 9 includes a housing 362 covering a pair of internally and pivotally mounted cutting blades 363 and 364. The housing 362 is generally a mirror image of the housing 316, except that the blades 363 and 364 are aligned to rotate at angles of ninety degrees to the blades 317 and 318, as seen in FIG. 23.

The first side support frame 310 comprises two radial members 370 and 371 joined near outer ends thereof with a axially aligned member 372. The axial aligned member has a downwardly extending trailing section 375 upon which is rotatably mounted a wheel 376. The wheel 376 has an axis of rotation which is generally parallel to the axis of rotation of the rear wheel 305. The inner ends of the radial members 370 and 371 are pivotally attached to the vehicle body 303 by pivot structures 378 and 379 respectively. The support frame 310 is also connected to the mower vehicle body 303 by a hydraulic ram 384 having a first pivotal connection 385 connecting the ram to the frame member 372 at one end thereof and a second pivotal connection 386 at an opposite end thereof connecting the ram 384 to the vehicle body 303. The ram 304 is operably connected to the hydraulic system of the mower 301 to maintain a downward pressure on the frame 310 as the mower 301 traverses various terrain. The structure for maintaining the pressure on the frame 310 by the hydraulic ram 384 is quite similar to the structure described for the previous embodiment for this purpose and will not be redescribed herein.

The second side support frame 311 is quite similar to but a mirror image of the first side support frame 310. In particular the second side support frame 311 includes an outrigger wheel 390 pivotally mounted near the radially outward side of the frame 311 at a spaced location from the vehicle body 303 and spaced from the vehicle wheels 304 and 305. The frame 311 is also pivotally connected to the body frame along an axis of rotation which is parallel aligned to an axis passing through the wheels 304 and 305. A hydraulic ram 391 pivotally connected to the vehicle body 303 and to the outer side of the frame 311 operably biases the frame 311 downwardly under control of an attitude adjustment system associated with the slope mower 1 which controls the hydraulic pressure to the ram 391 in a manner similar to the control of the ram 384.

In operation the slope mower 301 of the second embodiment is similar to the slope mower 1 of the first embodiment in that the attitude of the relatively thin vehicle body 303 mounted on spaced front and rear wheels 304 and 305 is maintained in a general vertical orientation by operation of the hydraulic system on the side frames 310 and 311. In particular, as the vehicle passes over various terrain the wheels 390 and 376 are operably biased against the ground by the rams 391 and 384 respectively so as to maintain the vehicle body 303 in an upright orientation. Operation of the 301 mower over different types of terrain can be seen in FIGS. 18 and 25.

The major difference between the slope mower 301 and the mower 1 is that the first and second mowers 308 and 309 of the present embodiment are generally independently mounted relative to the support frames 310 and 311. This allows the mowers 308 and 309 to be constructed of lighter material and to more easily follow the contour of the ground. This can be seen in FIG. 24. In particular, the second mower 309 is able to rotate upwardly so as to ride over a slight rise in the contour of the land beneath the mower 309, while the support frame wheel 376 follows a different contour. However, the mower 308 is connected by the chain 360 to the first frame 310 so that the operator can raise the mower 308 by override of the hydraulic system working through the ram 384, to raise the first support frame 310 into a raised and non-ground following orientation.

It is to be understood that while certain forms of the present invention have been illustrated and described herein, it is not to be limited to the specific forms or arrangement of parts described and shown.

What is claimed and desired to be secured by Letters Patent is as follows:

1. A mower vehicle for mowing slopes comprising:
  (a) a mower vehicle main frame having a generally vertical orientation, when in operation;
  (b) single front wheel means and single rear wheel means, each of said wheel means being connected to said main frame and generally aligned such that said frame is pivotal relative to the ground about a longitudinal line passing through the bottom of both said front and rear wheel means;
  (c) a prime mover mounted on said main frame and connected to at least one of said front wheel means and rear wheel means for movement of said mower vehicle across the ground;
  (d) a side frame pivotally connected to said main frame and swingable about an axis extending longitudinally of said main frame; said side frame extending laterally from said longitudinal axis and having a ground engageable outrigger wheel laterally spaced from said main frame;
  (e) a mower housing pivotally attached to and extending outwardly from said main frame so as to be swingable about a longitudinal axis associated therewith and including cutting means mounted therein; said mower housing being floatably connected to said side frame; and
  (f) pivoting means for pivoting said side frame about said longitudinal axis in automatic response to a change in terrain as said vehicle tranverses the terrain thereby allowing said side frame to follow the terrain while said main frame pivots about the terrain on said front and rear wheel means and remains in the vertical orientation thereof and allowing said mower housing to follow the terrain directly below said mower housing generally independent of said side frame and said main frame.

2. The vehicle according to claim 1 wherein:
  (a) said side frame is a first side frame and said mowing housing is first mowing housing; and including:
  (b) a second side frame being pivotally connected to said main frame on an opposite side of said main frame relative to said first side frame; said second side frame being swingable about an axis extending longitudinally of said main frame; said second side frame extending laterally from said longitudinal axis and having an associated ground engageable outrigger wheel laterally spaced from said main frame; and
  (c) said second mower housing including cutting means and being mounted generally beneath said second side frame.

3. The vehicle according to claim 1 including:
  (a) level control means cooperating with said pivoting means such that said pivoting means bias against both said main frame and said side frame so as to maintain said main frame in the vertical orientation thereof.

4. A mower vehicle for mowing slopes comprising:
(a) a mower vehicle main frame having a generally vertical upright orientation when in operation and an operator seat adapted to receive an operator;
(b) single front ground engaging wheel means and single rear ground engaging wheel means, each of said wheel means being connected to said main frame and generally aligned such that said main frame and wheel means are pivotal relative to the ground on a longitudinal axis passing through a lower portion of both of said front and rear ground engaging wheel means when said wheel means are engaging the ground;
(c) a prime mover mounted on said main frame and connected to at least one of said front wheel means and rear wheel means for movement of said mower vehicle across the ground;
(d) a side frame pivotally connected to said main frame and swingable about an axis extending longitudinally of said main frame; said side frame extending laterally from said longitudinal axis and having a ground engageable outrigger wheel laterally spaced from said main frame;
(e) a mower housing including cutting means and being mounted generally beneath said side frame; said mower housing being pivotally connected on one side thereof to said main frame so as to be swingable about a longitudinal axis associated therewith relative to said main frame and floatably connected to said side frame; said mower housing including mobile support means spaced laterally from said main frame; said mower housing pivotally floating independent of said side frame to allow said mower housing to follow ground terrain directly beneath said mower housing generally independent of said main frame and said side frame;
(f) pivoting means operationally pivoting said side frame about said longitudinal axis in response to a change in the angle of the terrain relative to horizontal such that said side frame follows the terrain and said main frame remains upright; and
(g) level control means cooperating with said pivoting means to maintain said main frame in the vertical orientation thereof whereby when an operator is positioned in said operator seat, the operator is maintained in an upright attitude even when said vehicle passes over non-horizontal terrain.

5. The vehicle according to claim 4 wherein:
(a) said side frame is a first side frame and said mower housing is first mower housing; and including:
(b) a second side frame pivotally connected to said frame on an opposite side of said main frame relative to said first side frame; said second side frame being swingable about an axis extending longitudinally of said main frame; said second side frame extending laterally from said longitudinal axis and having an associated ground engageable outrigger wheel laterally spaced from said main frame; and
(c) said second mower housing including cutting means mounted in said second mower housing; said second mower housing being pivotal on one side thereof with respect to said main frame and having mobile support means on the opposite side thereof.

6. The vehicle according to claim 4 wherein:
(a) said level control means includes automatic adjustment to maintain said main frame in the upright orientation thereof by biasing said pivoting means against said main frame and said blade housing and by controlling the degree of such biasing; and
(b) a manual override to allow an operator to control the attitude of said main frame.

7. The vehicle according to claim 4 including:
(a) adjustment means to allow variance in the relative height of said mower housing relative to said main frame.

* * * * *